(12) United States Patent
Messenger et al.

(10) Patent No.: US 10,097,686 B2
(45) Date of Patent: *Oct. 9, 2018

(54) OUTGOING CALL MANAGEMENT IN A COMMUNICATION ENVIRONMENT WITH UNIFIED COMMUNICATION INTERFACES

(71) Applicant: Hearsay Social, Inc., San Francisco, CA (US)

(72) Inventors: David Messenger, Westport, CT (US); Peter Lurie, New York, NY (US); David Dawson, Tampa, FL (US)

(73) Assignee: Hearsay Social, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,908

(22) Filed: May 2, 2017

(65) Prior Publication Data

US 2017/0244832 A1    Aug. 24, 2017

Related U.S. Application Data

(63) Continuation of application No. 14/827,193, filed on Aug. 14, 2015, now Pat. No. 9,661,131.

(Continued)

(51) Int. Cl.
*H04M 3/42* (2006.01)
*H04M 1/2745* (2006.01)
(Continued)

(52) U.S. Cl.
CPC . *H04M 3/42059* (2013.01); *H04M 1/274533* (2013.01); *H04M 1/72583* (2013.01);
(Continued)

(58) Field of Classification Search
CPC ..... H04W 74/00; H04W 76/02; H04W 88/06; H04W 92/04; H04W 8/28; H04W 60/00; H04W 8/26; H04W 40/02; H04W 88/00; H04W 48/18; H04W 72/0433; H04W 88/16; H04W 88/08; H04W 16/14; H04W 36/0022; H04W 36/0066; H04W 28/16; H04W 36/0061; H04W 72/12;
(Continued)

(56) References Cited

U.S. PATENT DOCUMENTS 9,473,625 B1 * 10/2016 Messenger ...... H04M 1/274533
2006/0234693 A1 * 10/2006 Isidore .............. H04M 1/72519
455/422.1

(Continued)

*Primary Examiner* — Nimesh Patel
(74) *Attorney, Agent, or Firm* — Van Pelt, Yi & James LLP

(57) ABSTRACT

A computer-implemented method for managing a billing policy for mobile phone associated with a first phone number corresponding to a first account and a second phone number corresponding to a second account is described herein. The billing policy defines actions performed by the mobile phone to be charged to the first account, and defines actions performed by the mobile phone to be charged to the second account. Charges are allocated to one of the first account and second account based on the billing policy. A user can configured to phone to operate in a private mode, in response to which actions are charged to a default account of the two accounts, and information about the action is not provided to an external entity.

20 Claims, 10 Drawing Sheets

Related U.S. Application Data

(60) Provisional application No. 62/184,174, filed on Jun. 24, 2015.

(51) Int. Cl.
*H04M 1/725* (2006.01)
*H04W 24/02* (2009.01)
*H04W 76/02* (2009.01)
*H04W 76/10* (2018.01)

(52) U.S. Cl.
CPC ... H04M 3/42042 (2013.01); H04M 3/42068 (2013.01); *H04W 24/02* (2013.01); *H04W 76/02* (2013.01); *H04W 76/10* (2018.02)

(58) Field of Classification Search
CPC . H04W 92/24; H04W 84/005; H04W 84/042; H04W 84/045; H04W 4/16; H04W 8/18; H04W 8/183; H04L 63/08; H04L 67/147; H04L 65/1016; H04L 65/01; H04L 12/6418; H04L 12/14; H04L 12/1457; H04L 29/12839; H04L 29/12952; H04L 61/6077; H04M 2207/18; H04M 3/51; H04M 1/72519; H04M 3/42246; H04M 15/77; H04M 2215/72
See application file for complete search history.

(56) References Cited

U.S. PATENT DOCUMENTS

| | | | |
|---|---|---|---|
| 2010/0081460 A1* | 4/2010 | Knight | H04L 12/6418 455/461 |
| 2012/0030373 A1* | 2/2012 | Yang | H04L 12/5692 709/244 |
| 2014/0148165 A1* | 5/2014 | Serravalle | H04W 16/14 455/436 |

* cited by examiner

OUTGOING CALL MANAGEMENT IN A COMMUNICATION ENVIRONMENT WITH UNIFIED COMMUNICATION INTERFACES

CROSS-REFERENCE To RELATED APPLICATION(S)

This application is a continuation of U.S. application Ser. No. 14/827,193, filed Aug. 14, 2015, now U.S. Pat. No. 9,661,131, which application claims priority under 35 U.S.C. § 119(e) to U.S. Provisional Patent Application Ser. No. 62/184,174, "Communication Environment with Unified Communication Interfaces," filed Jun. 24, 2015, all of which is incorporated herein by reference in its entirety.

BACKGROUND

1. Field of the Disclosure

This disclosure pertains in general to communications, and more specifically to a mobile phone communication environment enabling a unified communication interface for multiple phone numbers and contact groups within a single device.

2. Description of the Related Art

Mobile devices including smart phones and tablets have become ubiquitous. People use mobile devices for personal reasons to stay connected with family and friends, and also for business purposes. It is cumbersome to carry multiple mobile devices for different uses. Nevertheless, mobile devices are usually associated with one ID (e.g., a Subscriber Identity Module (SIM), an International Mobile Subscriber Identity (IMSI), an Electronic Serial Number (ESN), and the like), and are typically associated with one phone number. When using such devices for multiple purposes, it is complex to manage and track communications and costs, to safeguard secured or private communications, and to maintain work and life balance. Each individual typically has multiple phone numbers (e.g. office, mobile, home) for different purposes. As a result, communications between people are fragmented across multiple numbers.

SUMMARY

One embodiment of the computer-implemented method for managing incoming calls comprises receiving, at an intermediate server communicatively coupled to a mobile phone associated with a first phone number corresponding to a first contact group and a second phone number corresponding to a second contact group, a request to receive an incoming call associated with a caller phone number. The request corresponds to the first phone number or the second phone number. In response to receiving the request to receive the incoming call, the intermediate server identifies a contact group associated with the request. The identified contact group comprises the first contact group in response to the received request corresponding to the first phone number, and the identified contact group comprises the second contact group in response to the received request corresponding to the second phone number. The intermediate server selects a notification based on the identified contact group, wherein the selected notification comprises a first notification in response to the identified contact group comprising the first contact group, and wherein the selected notification comprises a second notification in response to the identified contact group comprising the second contact group. The first notification is different from the second notification. The intermediate server modifies the request to receive an incoming call to include the selected notification and routes the modified request to the mobile phone.

One embodiment of a non-transitory computer-readable storage medium storing executable computer program instructions for managing incoming calls that, when executed by a hardware processor, performing steps comprising receiving, at an intermediate server communicatively coupled to a mobile phone associated with a first phone number corresponding to a first contact group and a second phone number corresponding to a second contact group, a request to receive an incoming call associated with a caller phone number. The request corresponds to the first phone number or the second phone number. In response to receiving the request to receive the incoming call, the intermediate server identifies a contact group associated with the request. The identified contact group comprises the first contact group in response to the received request corresponding to the first phone number, and the identified contact group comprises the second contact group in response to the received request corresponding to the second phone number. The intermediate server selects a notification based on the identified contact group, wherein the selected notification comprises a first notification in response to the identified contact group comprising the first contact group, and wherein the selected notification comprises a second notification in response to the identified contact group comprising the second contact group. The first notification is different from the second notification. The intermediate server modifies the request to receive an incoming call to include the selected notification and routes the modified request to the mobile phone.

One embodiment of a system for managing incoming calls comprising an intermediate server communicatively coupled to a mobile phone associated with a first phone number and a second phone number. The intermediate server comprises a non-transitory computer-readable storage medium storing executable instructions and one or more hardware processors configured to execute the instructions to perform steps comprising receiving, at an intermediate server communicatively coupled to a mobile phone associated with a first phone number corresponding to a first contact group and a second phone number corresponding to a second contact group, a request to receive an incoming call associated with a caller phone number. The request corresponds to the first phone number or the second phone number. In response to receiving the request to receive the incoming call, the intermediate server identifies a contact group associated with the request. The identified contact group comprises the first contact group in response to the received request corresponding to the first phone number, and the identified contact group comprises the second contact group in response to the received request corresponding to the second phone number. The intermediate server selects a notification based on the identified contact group, wherein the selected notification comprises a first notification in response to the identified contact group comprising the first contact group, and wherein the selected notification comprises a second notification in response to the identified contact group comprising the second contact group. The first notification is different from the second notification. The intermediate server modifies the request to receive an incoming call to include the selected notification and routes the modified request to the mobile phone.

One embodiment of the computer-implemented method for managing incoming calls comprises receiving, at an intermediate server communicatively coupled to a mobile phone associated with a first phone number corresponding to a first contact group and a second phone number corresponding to a second contact group, a request to receive an incoming call associated with a caller phone number. The request corresponds to the first phone number or the second phone number. In response to receiving the request to receive the incoming call, the intermediate server identifies a contact group associated with the request. The identified contact group comprises the first contact group in response to the received request corresponding to the first phone number, and the identified contact group comprises the second contact group in response to the received request corresponding to the second phone number. The intermediate server selects a notification based on the phone number corresponding to the request, wherein the selected notification comprises a first notification in response to the identified contact group comprising the first contact group, and wherein the selected notification comprises a second notification in response to the identified contact group comprising the second contact group. The first notification is different from the second notification. The intermediate server modifies the request to receive an incoming call to include the selected notification and routes the modified request to the mobile phone.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

Figure (FIG. 1 is a high-level block diagram of a system for communications, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments relate to unified communication interfaces that provide and manage communication services. A unified communication service provides communication services to one or more of the users that are complementary to the communication services provided by the service providers of the users. A unified communication service allows users to unify activities across different interfaces. A user may register and configure the service to receive various combinations of communication services provided by the unified communication service. A unified communication service stores and manages a user's contacts. A user's contact may be assigned to a contact group including contacts of the same type. The user may also create, edit, or manage a contact group including a set of contacts and the associated contact group settings. A unified communication service manages different types of communication services (e.g., calls, SMS, MMS, voicemails, etc.) based on the contacts. The unified communication service allows a user to configure and manage different billing policies and determine costs of various communications. In addition, the unified communication service manages privacy settings for various communication services; a user can make various communications private to other users. In addition, a unified communication interface may allow integration with business software or interfaces such as customer relationship management (CRM) systems.

Figure 1:
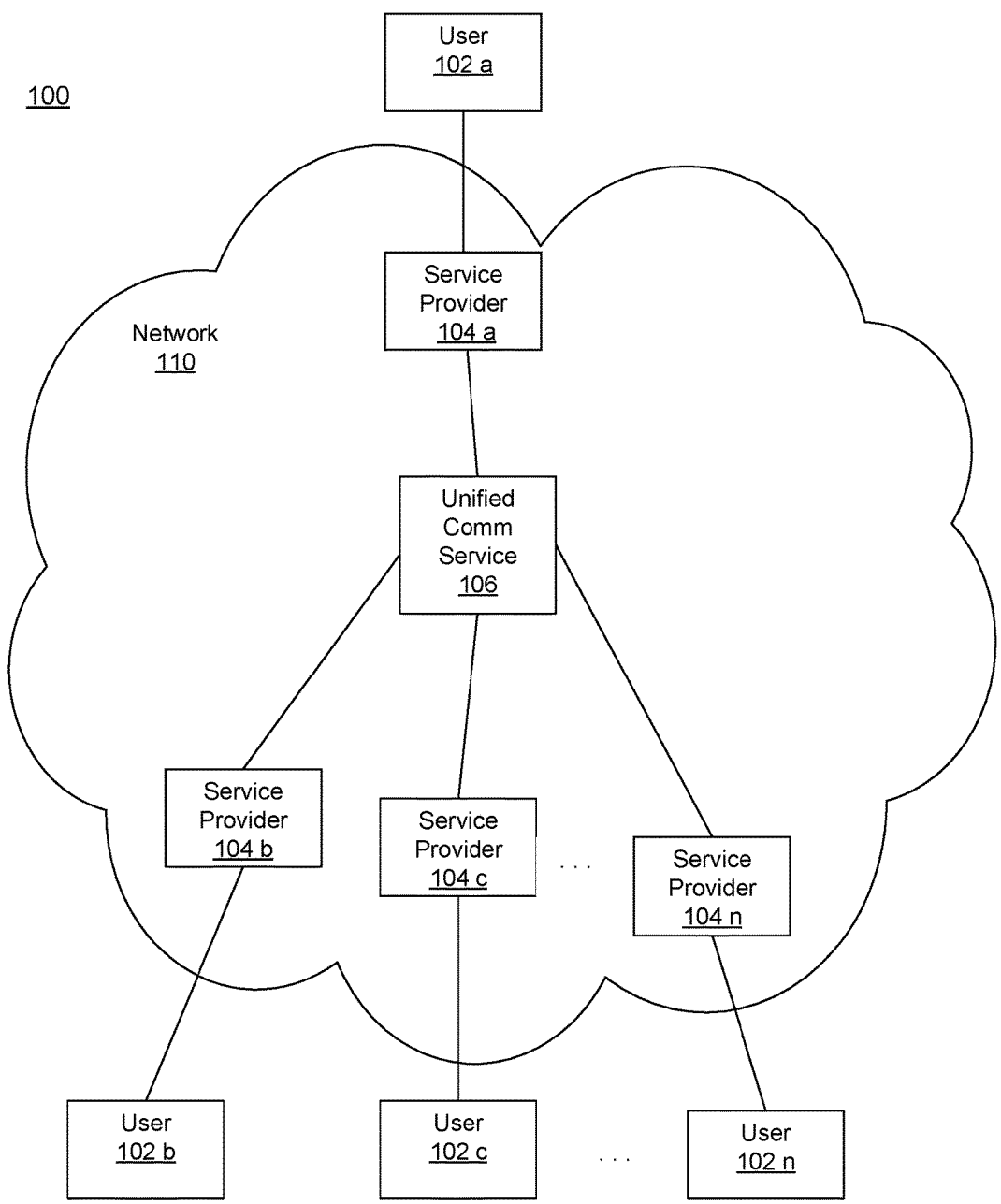

FIG. 1 is a high-level block diagram of a system 100 for communications, according to one embodiment. The system 100 includes a network 110 and users 102a-n. The user 102a may communicate one or more of the users 102b-n via a phone (or "cell phone" or "mobile device" hereinafter) associated with each user (not illustrated in the embodiment of FIG. 1). One or more of the users 102b-102n may be contacts of the user 102a. A contact of the user 102a is a person whose identity (e.g., name, phone number, social network ID) is known to the user 102a. For example, a record of a contact's name as well as one or more phone numbers including cell phone number, work phone number, or home phone number may be associated and stored as a record on the cell phone of the user 102a. The network 110 enables communications among the users 102a-n. The network 110 can be a cellular network based on technologies or protocols such as a Global System for Mobile Communications (GSM), General Packet Radio Service (GPRS), Enhanced Data Rates for GSM Evolution (EDGE), Universal Mobile Telecommunications System (UMTS), Evolution-Data Optimized (EV-DO), Code Division Multiple Access (CDMA), Long Term Evolution (LTE), etc. The network 110 may be a wireless or a wired network. The network 110 can include links based on technologies including Ethernet, 802.11, worldwide interoperability for microwave access (WiMAX), 4G, digital subscriber line (DSL), asynchronous transfer mode (ATM), InfiniBand, PCI Express Advanced Switching, multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The users 102a-n ("users 102") are connected to the network via their respective service providers 104a-n ("service providers 104"). The service providers 104 provide services (e.g., radio spectrum allocation, network infrastructure, back haul infrastructure, billing, customer care, provisioning computer systems) to the users 102 to access the network 110. A service provider of the service providers 104b-n may be the same as or different from the service provider 104a, and may be in the same region as or at a different region from the service provider 104a. For example, the service provider 104a and the service provider 104b are the same first local carrier in the U.S., the service provider 104c is a different second local carrier in the U.S., and the service provider 104n is a local carrier in France. As used herein, "service provider" refers to an entity that provides, through a combination of communicative hardware and software systems, a wireless communicative interface for use by a mobile device. Examples of service provides include AT&T, Verizon Wireless, Sprint, T-Mobile, and the like.

The unified communication service 106 provides communication services to one or more of the users 102 that are complementary to the communication services provided by the service providers 104. For example, the unified communication service 106 can manage the communications among the users 102. A user may register with the unified communication service 106 and can select or subscribe to various communication services provided by the unified communication service 106 through a platform or interface provided by the unified communication service 106. For example, the unified communication service 106 can manage a user's contacts by associating each contact with a particular set or group of contacts, can manage outgoing and incoming calls for an associated device, can manage short message services (SMSs) and multimedia message services (MMSs), can provide voicemail services, can manage billing policies and device/communication service usage, can manage privacy policies for a user, etc. The user may access the unified communication service 106 via a user interface, a website, or an application installed on a device (e.g., a mobile device such as a cellphone, a smart phone, a tablet, or a laptop; a wearable device such as a watch or a glass; a laptop or a desktop; or a vehicle such as a car). The unified communication service 106 is described in great detail in conjunction with FIG. 2. It should be noted that in some embodiments, the unified communication service 106 is implemented by one or more service providers 104, for instance in hardware, software, or both controlled by a service provider 104 and configured to perform the functionalities described herein.

Figure 2:
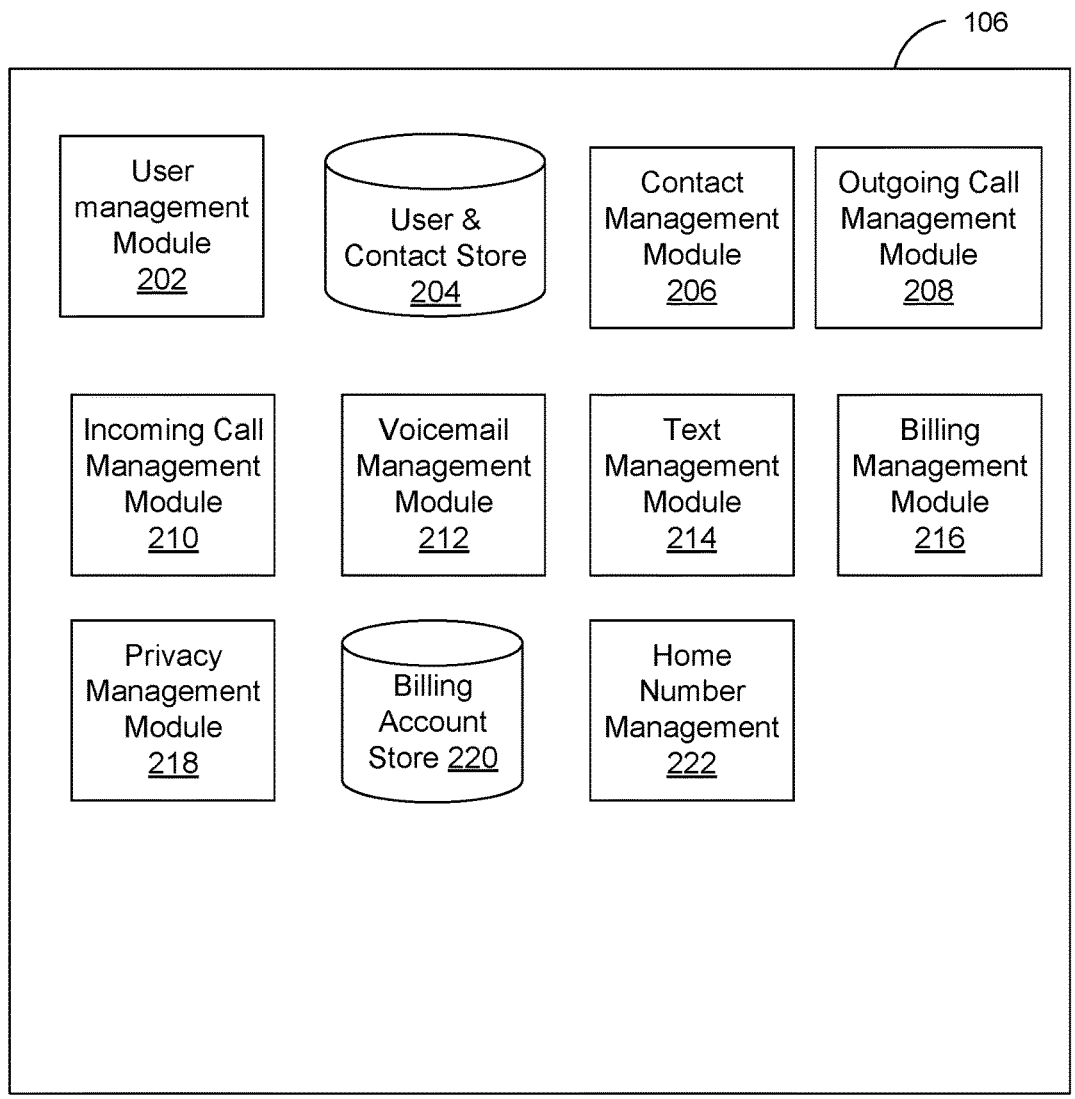
FIG. 2 is a block diagram illustrating an example unified communication service, according to one embodiment.

FIG. 2 is a block diagram illustrating an example unified communication service 106, according to one embodiment. The unified communication service 106 includes specialized communication hardware configured to perform the communication services described herein. The unified communication service 106 also includes a computing system with a hardware processor adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on a storage device, loaded into a memory, and executed by a processor. The illustrated unified communication service 106 includes a user management module 202, a user and contact store 204, a contact management module 206, an outgoing call management module 208, an inbound call management module 210, a voicemail management module 212, a text management module 214, a billing management module 216, a privacy management module 218, a billing account store 220, a home number management module 222, and a business integration module 224. Those of skill in the art will recognize that other embodiments can have different and/or other modules than the ones described here, and that the functionalities can be distributed among the modules in a different manner. As described herein, a user may be an individual or an entity.

The unified communication service 106 allows users to unify activities across different interfaces. For example, applications installed on a user's device and a user's web activities over a browser can be accessed via the unified communication service 106. Different mediums of communications (e.g., calls, text messages, emails, etc.) with different contacts are organized by contact identity rather than phone numbers or addresses. All activities in the network are managed and accessed by the unified communication service 106. For example, the unified communication service 106 may provide a threaded view per contact showing all activities with that contact over all activity mediums that go through the network 110 regardless of the device used by the contact or the medium through which the activity occurs. For example, a user may call a contact (Tom), may receive a voicemail from Tom, and may receive text messages from Tom from the user's web browser all within the unified communications service 106 that shows all the above-mentioned communications with Tom regardless of which device the user or Tom uses. The unified communication service 106 may provide a single threaded view that integrates communications of different mediums such as calls (to/from one or more phone numbers), messaging (text or instant messaging), voicemail, email, communications within apps, or any other suitable type of interaction. Accordingly, the unified communication service 106 can provide one continuous thread where a user can access all communication activities with a contact. The user can switch between on/off filters in the view of the threaded communications to include/exclude certain mediums. When a contact uses different numbers, that is, when a contact is associated with multiple numbers, the unified communication service 106 allows a user to merge different threads of communications with this contact into one single thread or to keep them apart (for instance, interactions associated with a personal phone number can be kept within a "personal" unified communication thread, and interactions associated with a work phone number can be kept within a "work" unified communication thread).

The unified communication service 106 allows a user to manage when the user or associated users (e.g., employees of a company) can receive communication services associated with one or more particular numbers. For example, the unified communication service 106 may provide a do not disturb user interface via which the user can set according to the day and hour (e.g., DND for Work Number activates at 7 pm each day and deactivates at 8 am). The unified communication service adjusts the time for changes in time zone. As one example, a company can set active hours for business communications (e.g., phone calls, text messages, etc. from and to business numbers, emails from and to business email addresses) for selected employees and limit overtime wages.

The user management module 202 allows a user to manage communication services, and creates, manages, and stores user information in the user and contact store 204. The user management module 202 may provide an interface for a user to register, select, and manage communication services provided by the unified communication service 106. For example, the user may register to receive communication services provided by the unified communication interface via a website, where the user creates an account. The user may register by activating a user application of the unified communication service 106 and creating an account thereafter. In some embodiments, the user application may be preinstalled on the device or integrated with the firmware of the device. The user management module 202 creates a unified communication ID for the user when the user registers and associates the unified communication ID with the user and stores such association in the user and contact store 204. The unified communication ID may be linked to one or more phone numbers and may be associated with one or more devices the user selects to receive communication services. The mobile phone that the user registers with the unified communication service 106 has a phone number with the region code (e.g., country code, and/or area code) associated with the device ID (e.g., Subscriber Identity Module (SIM), International Mobile Subscriber Identity (IMSI), Electronic Serial Number (ESN), or other unique identifier associated with the device hardware).

In addition, the user can opt to link the mobile phone with the unified communication ID and the unified communication service 106, which in turn can associate the mobile phone with a virtual device ID (a unique identifier assigned to the mobile phone by the unified communication service 106). The communication service 106 can then associate the mobile phone with a second phone number associated with the virtual device ID. As such, the user's mobile phone is linked with two phone numbers—a first number associated with the device ID and a second number associated with the virtual device ID or unified communication ID. The user may associate multiple devices with his or her account and a unified communication ID may be associated with multiple devices associated with the user's account. The user may further associate his or her accounts at social network services, messaging services, and the like with the account at the unified communication service 106 and/or the unified communication ID. In one embodiment, a user's phone is linked to a work number associated with a virtual device ID or unified communication ID and a personal number associated with the device ID. In another embodiment, a user's phone is linked to a personal number associated with a virtual device ID or unified communication ID and a work number associated with the device ID. In some embodiments, a user's phone is linked to a set of work numbers and a set of personal numbers.

A user may customize the user's account to receive various combinations of communication services received provided by the unified communication service 106. For example, the user may select voice call services, video call services, SMS services, MMS services, voicemail services, caller ID services, billing services, privacy services, or any combination thereof from the communication services provided by the unified communication service 106. The user and contact store 204 stores information associated with the user, such as the user's account ID, the unified communication ID, the virtual device ID, registered devices including associated information (e.g., device IDs, device models, service providers, etc.), one or more devices associated with the unified communication ID or virtual device ID, voicemail boxes and associated passwords, voicemail greeting messages, billing accounts (e.g., corporate, personal), the user's personal information (e.g., birthday, home address, work address, etc.), the user's accounts at social network services, the user's accounts at messaging services, the user's contacts and associated information (e.g., a contact's name(s), the contact's phone number(s) (e.g., home phone number, cellphone number, work phone number), the contact's type (e.g., business, friends, family, or acquaintance), the contact's company, the contact's department, the contact's email, the contact's social network profiles, the contact's instant messaging IDs, the contact's chat tool IDs, a call alert type (e.g., ringtone, volume, vibration, mute, or any combination thereof) associated with one of the contact's phone number(s), a SMS alert type (ringtone, volume, vibration, mute, or any combination thereof) associated with one of the contact's phone number(s), an alert type (ringtone, volume, vibration, mute, or any combination thereof) associated with one of the contact's social network update, an instant messaging alert type (ringtone, volume, vibration, mute, or any combination thereof) associated with receiving a type of instant message from the contact, an alert type (ringtone, volume, vibration, mute, or any combination thereof) associated with receiving a type of chat message from the contact, an alert type (ringtone, volume, vibration, mute, or any combination thereof) associated with receiving a voicemail from the contact, a contact's group (e.g., business, work, friends, family, or acquaintance), or whether or not a contact is blocked.) In addition, the user and contact store 204 can store one or more contact groups or sets of contacts, for instance a set of personal contacts and a set of work contacts. Ringtones can be selected from the device's native ringtones.

In some embodiments, information associated with the user and stored by the user and contact store 204 may further include subsidiary user accounts and associated information. For example, an entity's account may be stored with employee accounts that are subsidiary to the entity's account, or a parent's account may be stored with children's accounts that are subsidiary to the parent's account. A user may activate or deactivate a subsidiary account via the user management module 202. For example, the user may grant the subsidiary a license to register and use communication services provided by the unified communication service 106 and selected by the user. Under the license, a subsidiary account may be prohibited from registering and using some communication services provided by the unified communication service 106. When a user deactivates a subsidiary account, the license is revoked. The user may track, monitor, and manage subsidiary accounts. In one embodiment, a business may activate a subsidiary account for each of a set of employees, enabling the employees to access services provided by the unified communication service 106 and paid for/managed by the business.

The contact management module 206 manages a user's contacts stored in the user and contact store 204. When a user registers a device with the unified communication service 106, the contact management module 206 may recognize the user's contacts stored on the device. The user's contacts on the device but not associated with the user and stored in the user and contact store 204 can be copied from the device, associated with the user and stored in the user and contact store 204. The contact management module 206 may reconcile different contact information stored in the user and contact store 204 and on the device for the same contact and update the contact information accordingly stored in the user and contact store 204 or on the device. In some embodiments, the contact management module 204 may synchronize contacts of a user among devices registered and/or selected by the user. The contact management module may provide a user interface through which a user may create, edit, or manage a contact record storing a contact's information.

A user may also create, edit, or manage a contact group including a set of contacts and the associated contact group settings. Contacts of a contact group have the same contact type. In some embodiments, a contact can be only assigned to one contact group. In some embodiments, a contact can be assigned to multiple contact groups. Example contact groups include business contacts, personal contacts, family contacts, friend contacts, contacts of a geographic region, etc. A user may associate various device IDs, virtual device IDs, and/or phone numbers of the user with different contact groups. In the aforementioned example of a user linking two numbers with the user's mobile phone, the user may associate one number with a first contact group (e.g., business) and the other number with a second contact group (e.g., personal). A user may configure and apply a contact group setting to a group such as: an alert type (ringtone, volume, vibration, mute, or any combination thereof) for receiving voice calls, video calls, SMSs, MMSs, social network updates, instant messages, chat messages, or voicemails from a contact group; a frequency of receiving alerts associated with a contact group; whether or not to enable caller ID function for outgoing calls and a phone number associated with the mobile device to display to the receiving contact based on the contact group to which the receiving contact belongs; whether or not to enable caller ID for incoming calls from a contact and an indication within the caller ID of the contact group to which the contact belongs; whether or not to block communications from contacts within a contact group such that all incoming voice calls, video calls, SMSs, MMSs, social network updates, instant messages, chat messages, and voicemails, from the contact group cannot be completed, or a voicemail greeting message played to a contact based on the contact group to which the contact belongs. For example, a user may set a first ringtone for business contacts and a second ringtone for personal contacts, enabling the user to identify the contact group to which a contact calling the user belongs. Likewise, a user may select a "whisper" signal such that, when a user has answered a first call and receives a second call or a text message, the user is alerted to the received second call or text message by a soft audio signal that otherwise doesn't detract from the first call. For the purposes of simplicity, the remainder of the description herein will reference a mobile device associated with two phone numbers, a first associated with a personal contact group and a second associated with a business contact group.

Contacts can be classified as "personal" or "work" (and accordingly, assigned to the personal contact group or the work group) via the contact management module 206 in a number of ways. For instance, for an incoming call, if a contact calls the user's work phone number or personal phone number, the contact can be classified as a "work contact" or a "personal contact", respectively. If a user corresponds with a contact using his or her work or personal email address, the contact can be classified as a "work contact" or a "personal contact", respectively. For outgoing calls, a user can be prompted to press a button, provide a code, or speak a command after dialing an unknown contact's number in order to classify the contact's number as work or personal. For example, a user can be prompted to press "1" to classify a contact as a personal contact, and to press "2" to classify the contact as a work contact. In some embodiments, upon dialing an unknown contact's phone number, the contact management module 206 can query a user's personal contacts or work contacts to determine if a personal contact or work contact has previously dialed the phone number and, in response to such a determination, can classify the unknown contact as a personal or work contact, respectively.

Periodically (e.g., every week or every day), the contact management module 206 can provide a user 102a with a list of prospective contacts that has corresponded with the user 102a from their personal or work email addresses. The contact management module 206 determines whether the email address used by the user 102a for correspondence with each prospective contact is a personal or work address and classifies the contact based on the address used by the user 102a. The contact management module 206 does not recommend a contact to a user for classification when an email from a contact is deleted by the user 102a, either unopened or opened but with no further action taken. When a contact uses more than one address to correspond with the contact 102a, the contact management module 206 can use the last address used or the address used for a majority of correspondence as the basis for the assignment. The contact management module 206 can identify phone number sequences included in signature blocks in emails and can include these numbers in the prospective contact's record. The contact management module 206 can check whether a user 102a has called or received a call from the prospective contact. When a contact is already stored in user's contacts but is not assigned as a personal or work contact, the CSF classifies the contact based on the email address used in correspondence.

The contact management module 206 presents the analysis results of the prospective users to the user 102a. The user 102a may reject or change the classification of a prospective contact. When a user accepts a prospective contact, the contact management module 206 adds the contact to the user's contacts stored in the user and contact store 204 and/or the user's contact list stored in the user's device. The contact management module 206 also stores the contact group classification (e.g., a work contact or a personal contact) of the contact. In some embodiments, a user's contact group (e.g., work contacts, personal contacts) may be shared with one or more other users who are in the same group (e.g., a company group, a family group). The unified communication service 106 displays associated contact information for inbound calls to a main or any individual number to the user 102a.

In some embodiments, upon dialing an unknown contact's phone number, the contact management module 206 queries a user's contact database or social media account to determine if the unknown contact's phone number is associated with a contact within the contact database (such as a personal or work email account's address book) or social media/social network account, and if so, determines if the contact within the contact database or social media/social network account is a work contact or a personal contact. For example, if a contact is associated with an email account with a domain name associated with a user's employer, the contact can be classified as a work contact, and if a contact is associated with a "family relationship" in a social network, the contact can be classified as a personal contact. It should be noted that upon registering with the unified communication service 106, the contact management module 206 can query the user's contact database, social media account, or social network account in advance to classify potential contacts as work contacts and personal contacts, such that when the user calls a unknown contact number, the contact management module 206 can identify a pre-classified contact associated with the unknown contact number, and can classify the unknown contact based on the preclassification. Furthermore, the contact management module 206 creates a draft contact record including the number and any information it has found for this contact. The contact management module 206 may store the created draft contact record and enable a user to approve or decline this contact as well as to edit or add the information for this contact.

In some embodiments, a user can select one of a work contact and a personal contact as a default setting such that when the user calls new contacts, the new contact is classified according to the select default classification. Classified contacts can be subsequently reclassified by the user, for instance via an interface presented by the contact management module 206, or by entering a code or pressing a particular button after dialing the contact's phone number.

The outgoing call management module 208 manages outgoing calls including voice calls or video calls. The outgoing call management module 208 may provide an interface where a user may place an outgoing call. The interface may request the user to select a phone number associated with a mobile device of the user from which a call should be initiated and prepares the call using the selected number. For example, the outgoing call management module 208 may ask the user to speak or press one to call a recipient from the phone number associated with the business contact group or to speak or press two to call a recipient from the phone number associated with the personal contact group. The user may also call a recipient from the device's native call interface and the outgoing call management module 208 manages the call according to the contact type of the recipient, thus enabling a user to make a call with one of two phone numbers based on the contact type without requiring a modification to the user's mobile device. The contact type of the recipient may be determined by looking up the phone number associated with the recipient that the user calls in the user and contact store 204. The phone number of the user associated with the contact group to which the recipient belongs may be used to call the recipient. When the number selected by the user and the number associated with the contact group to which the recipient belongs conflict, the outgoing call management module 208 confirms with the user which number to use. The user's call is routed to the recipient with caller ID information identifying the phone number of the user used to make the call, beneficially enabling a user to prevent, for example, business contacts form seeing a phone number of the user associated with the personal contact group and vice versa.

When the recipient's phone number is unknown, the outgoing call management module 208 asks the user to select a phone number of the user to use for making the call. The user has the ability to turn this prompt on and off and to select a default number to use for unknown phone numbers, in both cases with a single touch. A contact record may be created and stored for the recipient and the recipient's number, and the recipient's contact type can be determined according to the phone number from which the user calls the recipient. For example, if a user calls a contact for a first time using the business phone number associated with the user, the contact and associated contact information can be stored as a business group contact within the user and contact store 204. In addition, the contact management module 206 creates a draft contact including the recipient's phone number and any information it has found for this contact. The contact management module 206 may store the created draft contact and enable a user to approve or decline this contact as well as to edit or add the information for this contact. The outgoing call management module 208 manages the outgoing call according to any user settings such as a setting associated with a contact group to which a call recipient belongs. In some embodiments, when the recipient does not answer, the outgoing call management module 208 may remind the user to call back the recipient after a predetermined time period. The predetermined time period may be specified by the user or according to the contact type of the recipient.

Figure 3:
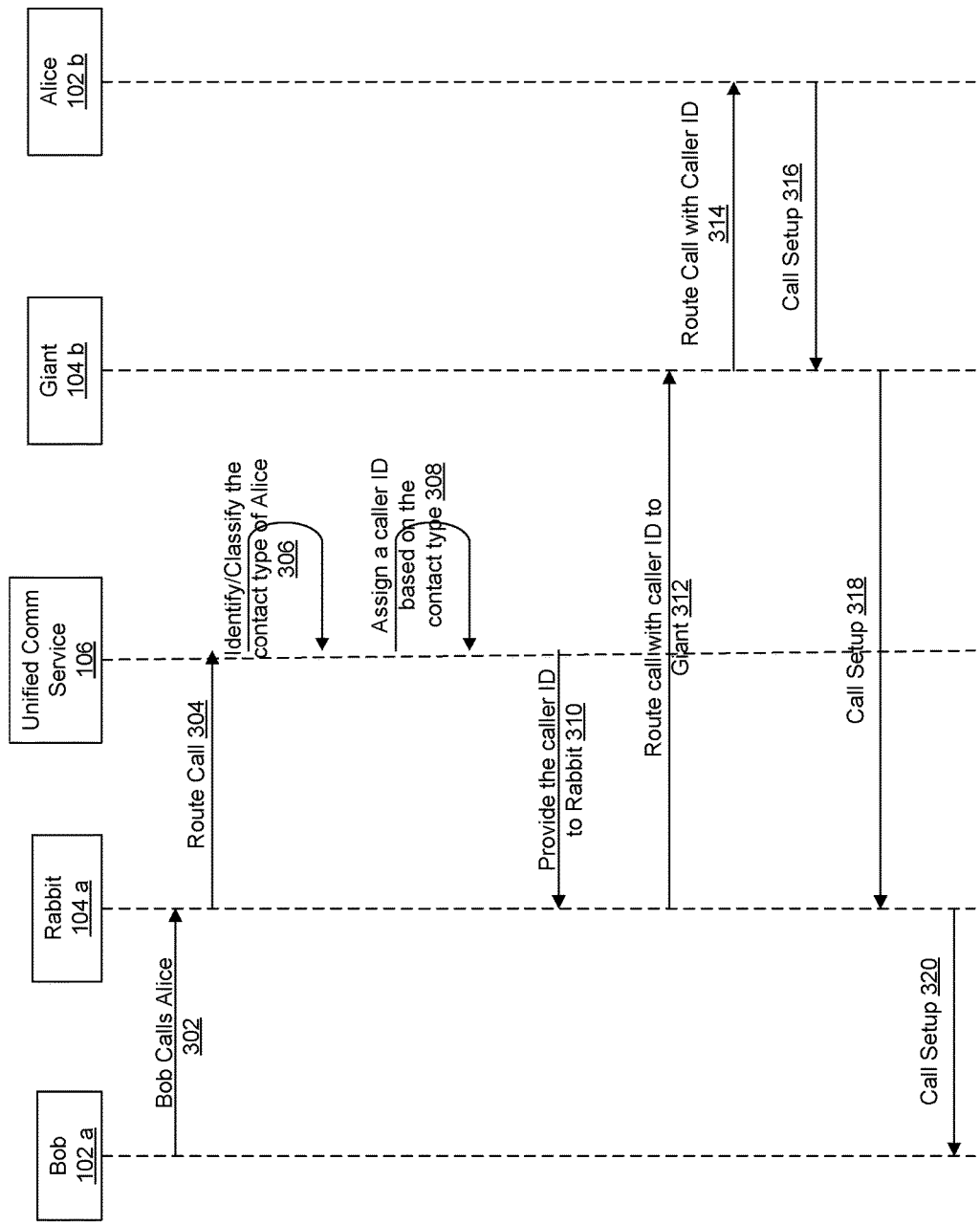
FIG. 3 illustrates a sequence diagram of an exemplary outgoing call, according to one embodiment.

FIG. 3 illustrates a sequence diagram of an exemplary outgoing call, according to one embodiment. A user Bob 102*a* calls 302 a recipient Alice 102*b* from his cellphone, which is linked to two numbers including a work phone number and a personal phone number. Bob 102*a* makes the call from an interface provided by the unified communication service 106 or the native dialer of his cellphone. Bob's cellphone service provider Rabbit 104*a* routes 304 Bob's call to Alice to the unified communication service 106. Rabbit 104*a* routes 304 the call according to various communication protocols, for example, Session Initiation Protocol ("SIP"). The unified communication service 106 (via, for example, the outgoing call management module 208), identifies or classifies 306 the contact type of Alice, for example, as business or personal. The unified communication service 106 assigns 308 a caller ID to the call based on the determined contact type. For example, Bob's work phone number should be used when Alice is determined to be a business contact and Bob's personal phone number should be used when Alice is determined to be a personal contact. The unified communication service 106 provides 310 the caller ID to Rabbit 104*a*, for example, by routing the call with the caller ID back to the Rabbit 104*a*. Rabbit 104*a* routes 312 the call with the caller ID to Alice's service provider Giant 104*b*. Giant 104*b* routes 314 the call with the caller ID to Alice 102*b*. When Alice answers, the call between Bob and Alice is set up involving a segment 316 between Giant 104*b* and Alice 102*b*, a segment between Giant 104*b* and Rabbit 104*a*, and a segment between Rabbit 104*a* and Bob 102*a*, according to various communication protocols. After the call is set up, Bob's and Alice's voice and/or images are communicated between Bob and Alice via Rabbit 104*a*, the unified communication service 106, and/or Giant 104*b*, according to various communication protocols. It should be noted that although the examples in this and the following figures are described in terms of a business contact group and a personal contact group, the functionalities described in the examples applies equally to any other sets of contact groups, such as local and international groups.

Referring back to FIG. 2, the incoming call management module 210 manages incoming calls including voice calls or video calls. The incoming call management module 210 may determine a call setting according to the caller's number. For example, the incoming call management module 210 determines whether or not the user should be notified and how the user should be notified according to the caller. The incoming call management module 210 may provide an interface where a user may answer an incoming call. The interface may provide and request the user to respond (e.g., answer, reject, ignore, mute, or block) to the incoming call by selecting or speaking a corresponding action. The user may also respond to an incoming call from the device's native call interface and the incoming call management module 210 manages the call according to the caller. In one embodiment, the incoming call management module 210 allows a user to block all incoming calls from unknown numbers.

The phone number of the user associated with the contact group to which the caller belongs or the contact type of the caller may be used to determine whether or not a call should be routed and how the user should be notified. The incoming call management module 210 may determine the contact type of the caller by looking up the caller's phone number from the user and contact store 204. Settings associated with that caller or contact group may be determined similarly. For example, a call should not be routed to the user when the caller, or the contact group of the caller, is blocked by the user at the time when the user is being called. Notification settings including ringtone, volume, vibration mode and level, response actions (e.g., answer, reject, mute, or respond by text messages, instant messages, chats, or emails), user interfaces, or call back reminders, may be determined according to the contact type and any settings associated with the caller, contact type, and/or contact group. Additional devices to alert the user and associated notification settings may be determined similarly.

When the caller's number is unknown, the incoming call management module 210 may notify the user via a user interface for unknown numbers, which in turn may enable the user to classify the caller as a work contact or a personal contact. A contact record for the caller may be created and stored within the user and contact store 204 based on the selection of a contact group for the caller by the user. The caller's contact type can be determined according to the user's number that the caller has called. For instance, if the caller calls the phone number of the user associated with the business contact group, the caller can be classified as a business group contact. The incoming call management module 210 manages an incoming call according to any user setting such as a contact group's setting that is applicable to the caller. In some embodiments, when the user does not answer, the incoming call management module 210 may, based on the contact group associated with the caller, remind the user to call back the caller after a predetermined time period or respond by text messages, emails, instant messages, or chat messages. Content of the text messages, emails, instant messages, or chat messages may be communicated to the user according to the contact type of the caller.

Figure 4:
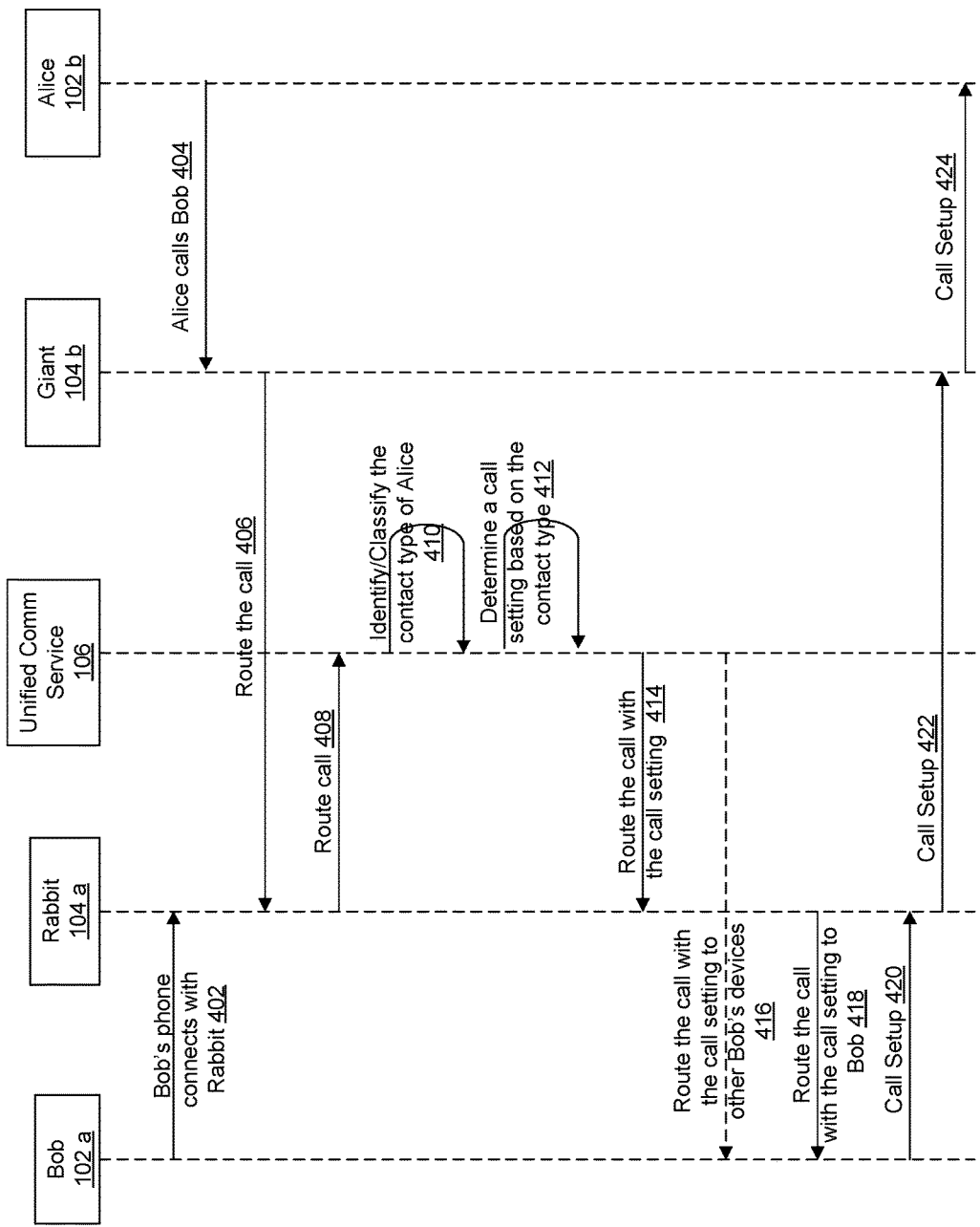
FIG. 4 illustrates a sequence diagram of an exemplary incoming call management module, according to one embodiment.

FIG. 4 illustrates a sequence diagram of an exemplary incoming call management module 210, according to one embodiment. Bob's phone connects 402 with the service provider Rabbit 104*a*. A caller Alice 102 calls 404 Bob by dialing Bob's phone number, and Alice's service provider Giant 104*b* routes 406 Alice's call to Bob's service provider Rabbit 104*a*. Rabbit routes 408 the call to the unified communication interface 106. The unified communication service 106, for example, the incoming call management module 210, identifies or classifies 410 the contact type of Alice as business or personal (for instance, based on whether Alice call Bob's business number of personal number). The unified communication service 106 determines 412 a call setting based on the determined contact type. Whether or not Bob should be notified at Bob's phone associated with the number that Alice called, how to notify Bob on Bob's phone, whether there are other device(s) additional to Bob's phone, and how to notify Bob on those devices is determined based on the determined contact type. For example, a first ringtone should be used when Alice is determined to be a business contact and a second ringtone should be used when Alice is determined to be a personal contact. The unified communication service 106 routes 414 the call with the call setting to Rabbit 104*a* (or with the identified contact type), which routes 418 the call with the call setting to Bob 102*a* at his phone. The unified communication service 106 may route 416 the call with the call setting to Bob at other devices determined. When Bob answers his phone, the call between Bob and Alice is set up involving a segment 410 between Bob 102*a* and Rabbit 104*a*, a segment 422 between Rabbit 104*a* and Giant 104*b*, and a segment between Giant 104*b* and Alice 102*b*. After the call is set up, Bob's and Alice's voice and/or images are related between Bob and Alice via Rabbit 104*a*, the unified communication service 106, and/or Giant 104*b*, according to various communication protocols. In some embodiments, Bob's device receives the call from Alice, identifies a contact group associated with Alice (for instance based on a contact type received from the unified communication service 106, or based on contact groups stored locally at Bob's device), and alerts Bob to the call based on the identified contact group (for instance, using a vibration pattern for a business contact and a particular ringtone for a personal contact).

Referring back to FIG. 2, the voicemail management module 212 manages voicemails for unanswered (e.g., missed or rejected) incoming calls including voice calls or video calls. The voicemail management module 212 may determine a voicemail setting according to the caller's contact type. For example, the voicemail management module 212 determines whether or not the user should be notified and how the user should be notified according to the contact type. The voicemail management module 212 may provide an interface where a user may create, edit, and manage voicemail greeting messages and where the user may review a voicemail message. The interface may provide and request the user to respond (e.g., review, forward, ignore, delete, remind later, or block) to a voicemail message by selecting or speaking a corresponding action. The user may also respond to a voicemail message from the device's native call interface and the voicemail management module 212 manages the call according to the caller's contact type.

The number associated with the contact group to which the caller belongs or the contact type of the caller may be used to determine whether or not and how the caller can leave a voicemail as well as whether or not and how a user should be notified. The voicemail management module 210 may determine the contact type of the caller and settings associated with the caller by looking up the caller's phone number from the user and contact store 204. For example, a professional voicemail greeting message can be used when the caller is a business contact and a casual voicemail greeting message can be used when the caller is a personal contact. Notification settings including ringtone, volume, vibration including mode and level, response actions (e.g., review, forward, delete, remind later, or respond by text messages, instant messages, chats, or emails), user interfaces, or call back reminders, may be determined according to the contact type and any settings associated with the caller, contact type, and/or contact group. Additional devices or ways to alert the user and associated notification settings may be determined similarly.

When the caller's number is unknown, the voicemail management module 212 may determine whether or not a caller can leave a voicemail and can select a voicemail greeting message. A contact record may be created and stored for the user to store the caller and the caller's number. The caller's contact type can be determined according to the user's number that the caller has called. The voicemail management module 212 manages a voicemail message according to any user's setting such as a contact group's setting that is applicable to the caller. In some embodiments, the voicemail management module 212 may remind the user to call back the caller after a predetermined time period or respond by text messages, emails, instant messages, or chat messages. The predetermined time period may be specified by the user or according to the contact type of the caller.

Figure 5:
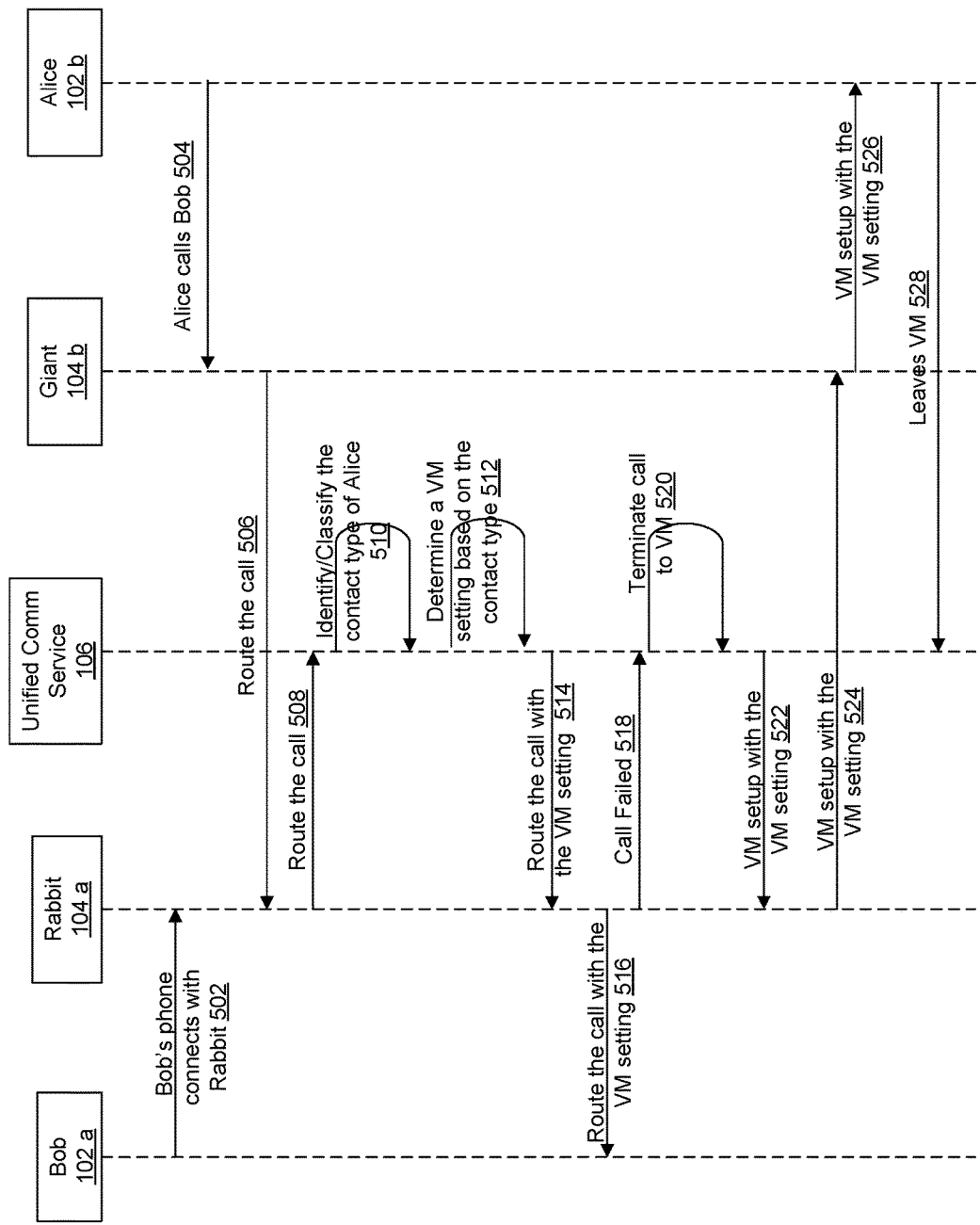
FIG. 5 illustrates a sequence diagram of an exemplary voicemail management module 212, according to one embodiment.

FIG. 5 illustrates a sequence diagram of an exemplary voicemail management module 212, according to one embodiment. Bob's phone connects 502 with the service provider Rabbit 104a. A caller Alice 102b calls 504 Bob by dialing a phone number associated with Bob's, and Alice's service provider Giant 104b routes 506 Alice's call to Bob's service provider Rabbit 104a. Rabbit 104a routes 508 the call to the unified communication interface 106. If upon ringing Bob's phone (as shown in FIG. 4), Bob doesn't answer the phone after a predetermined amount of time (or if Bob elects to forward the call immediately to voicemail), the unified communication service 106, for example, the voicemail management module 212 determines 512 a voicemail setting based on the determined contact type associated with the call. Whether or not the voicemail box should be activated, which voicemail greeting message, whether Bob should be notified at Bob's phone associated with the voicemail left by Alice, how to notify Bob on Bob's phone, whether there are other device(s) additional to Bob's phone, and/or how to notify Bob on those devices are determined based on the determined contact type. For example, a first greeting message should be used when Alice is determined to be a business contact and a second greeting message should be used when Alice is determined to be a personal contact. The unified communication service 106 routes 514 the call with the voicemail setting to Rabbit 104a, which routes 516 the call with the voicemail setting to Bob 102a at his phone. When Bob fails to answer his phone, Rabbit 104a notifies the unified communication service 106 that the call is failed, and the unified communication service 106 terminates 520 the call and initiates to set up a voicemail. The unified communication service 106 routes 522 the voicemail setup instruction with the voicemail setting to Rabbit 104a, which routes 524 the voicemail setup instruction with the voicemail setting to Giant 104b, which routes 526 the voicemail setup instruction with the voicemail setting to Alice 526. Alice leaves 528 a voicemail, which the unified communication service 106 may notify Bob 102a according to the determined voicemail setting. In some embodiments, when Bob's phone is not connected with Rabbit 104a, Rabbit 104a cannot find Bob's phone and notifies the unified communication service 106 that call to Bob has failed.

The text management module 214 manages outgoing and incoming text messages including SMSs and MMSs. The text management module 214 may manage outgoing and incoming text messages according to the recipient and the sender, respectively. For example, the text management module may determine a number from which to send a text message according to the recipient. The text management module 214 may determine a text message setting according to the text message sender's number. For example, the text management module 214 determines whether or not the user should be notified and how the user should be notified according to the text message sender. The text message module 214 may provide an interface where a user may edit and send a text message as well as review and respond to a text message. For outgoing text messages, the interface may request the user to select a number from which to send a text message. The user may also send a text message to a recipient from the device's native text message interface and the text management module 214 manages the text message according to the contact type of the recipient. The contact type of the recipient may be determined by looking up the number the user texts in the user and contact store 204. The number of the user associated with the contact group to which the recipient belongs or the contact type of the contact may be used to text the recipient. When the number selected by the user and the number associated with the contact group to which the recipient belongs conflict, the text management module 214 confirms with the user which number to use. The user's text message or a push notification on is routed to the recipient with the caller ID unless the caller ID is otherwise disabled by the user.

When the recipient's number is unknown, the text management module 214 prompts the user to determine a number to use for sending a text message. The text management module 214 temporarily stores the sent SMS and replies via SMS to the user requesting whether to treat the recipient as a business contact or a personal contact. This SMS conversation happens between the text management module 214 and the user to determine which contact group to use and should be completed within a specific time period (30 seconds for example) or the original SMS will be sent with the default contact group. The user can turn this prompt on and off, and can also set a number to use as a default for unknown numbers. A contact record may be created and stored for the user to store the recipient and the recipient's number, during which process, the recipient's contact type can be determined according to the number from which the user texts the recipient. The recipient may be assigned to a contact group according to the number from which the user texts the recipient. The outgoing call management module 208 manages the outgoing call according to any user's setting such as a contact group's setting that is applicable to the recipient.

For incoming text messages, the interface may provide and request the user to respond (e.g., retrieve, review, reply, delete, forward, or send read receipts) to an incoming text message by selecting or speaking a corresponding action. The user may also respond to an incoming text message from the device's native text message interface and the text management module 214 manages the text message according to the caller. The text management module 214 may determine a text message setting according to the sender's number or contact type. For example, the text management module 214 determines whether or not the user should be notified and how the user should be notified according to the sender's contact type. The number associated with the contact group to which the sender belongs or the contact type of the sender may be used to determine whether or not the sender's text message should be routed and whether or not and how a user should be notified are determined by the contact type of the sender and any settings associated with that sender. The text management module 214 may determine the contact type of the sender by looking up the sender's phone number from the user and contact store 204, or by determining whether the sender texted the user's phone number associated with the business contact group or the personal contact group. Settings associated with that sender may be determined similarly. Notification settings including ringtone, volume, vibration including mode and level, response actions (e.g., review, forward, delete, remind later, send read receipts, or respond by text messages, instant messages, chats, or emails), or user interfaces, may be determined according to the contact type and any settings associated with the sender, contact type, and/or contact group. Additional devices or ways to alert the user and associated notification settings may be determined similarly.

When the sender's number is unknown, the text management module 214 may notify the user via a user interface for unknown numbers. A contact record may be created and stored for the user to store the sender and the sender's number. The sender's contact type can be determined according to the user's number to which the sender sends a text message. The text management module 214 manages an incoming text message according to any user's setting such as a contact group's setting that is applicable to the caller. In some embodiments, when the user does not reply, the text management module 214 may remind the user to respond to the sender after a predetermined time period and/or responding by calls, text messages, emails, instant messages, or chat messages. The predetermined time period may be specified by the user or according to the contact type of the sender. Content of the text messages, emails, instant messages, or chat messages may be specified by the user or according to the contact type of the sender.

In some embodiments, the text management module 214 can route text messages differently based on the classification of a contact. For instance, for text messages sent to and received from personal contacts, the text management module 214 can route the text messages directly to and from a user's device (via the device's native text messaging applications) without routing the text messages through or exposing the text messages to the user's employer. Similarly, for text messages sent to and received from work contacts, the text management module 214 can route such text messages through the employer's servers or through an application at the unified communication service 106. In such embodiments, a user's employer can incorporate such text messages into customer relationship management ("CRM") processes, enabling the user's employer to potentially access such text messages, for instance for the purpose of creating business records or documents, for communication management purposes, for enabling customer support of the user, and the like. In some embodiments, an application associated with the unified communication service 106 can run on the user's device, and can directly receive such text messages. In these embodiments, the application can notify the user of a new text message from a work contact (beneficially enabling the user to identify when a text message from a work contact is received), and can route the text message to the device's native messaging application, enabling the user to access text messages from both personal contacts and work contacts within the same interface.

In some cases (for instance, where a user's device is an IPHONE®), the text management module 214 may route text messages via a device-specific messaging server (such as iMessage) when both the sender device and recipient devices are determined to be IPHONES®. The text management module 214 may only allow text messages being routed via iMessage when the recipient is a personal contact of the sender's. The text message module 214 may prevent text messages from being routed via iMessage when the recipient is a business contact of the sender's. This is because iMessage is a private communication channel and best suited for personal communication. Messages exchanged with contacts in the business group are only routed via the unified communication service 106, and messages exchanged with contacts in the personal group are routed via the unified communication service 106 as well as, optionally, a native interface (e.g., iMessage). As such, the unified communication service 106 may integrate business processes to exchange messages with business contacts. For example, in some embodiments, the unified communication service 106 allows using business processes such as CRM to exchange messages with business contacts. In some embodiments, the unified communication service 106 delivers messages exchanged with contacts as data but free of data roaming charges. For example, for users who are on a roaming network, the unified communication service 106 may allow communication to this business message delivery mechanism free of roaming charges by allowing data communications with those servers when the user is in the roaming network even if the user has turned off data roaming, provided the user has not also turned off voice and SMS roaming.

Figure 6:
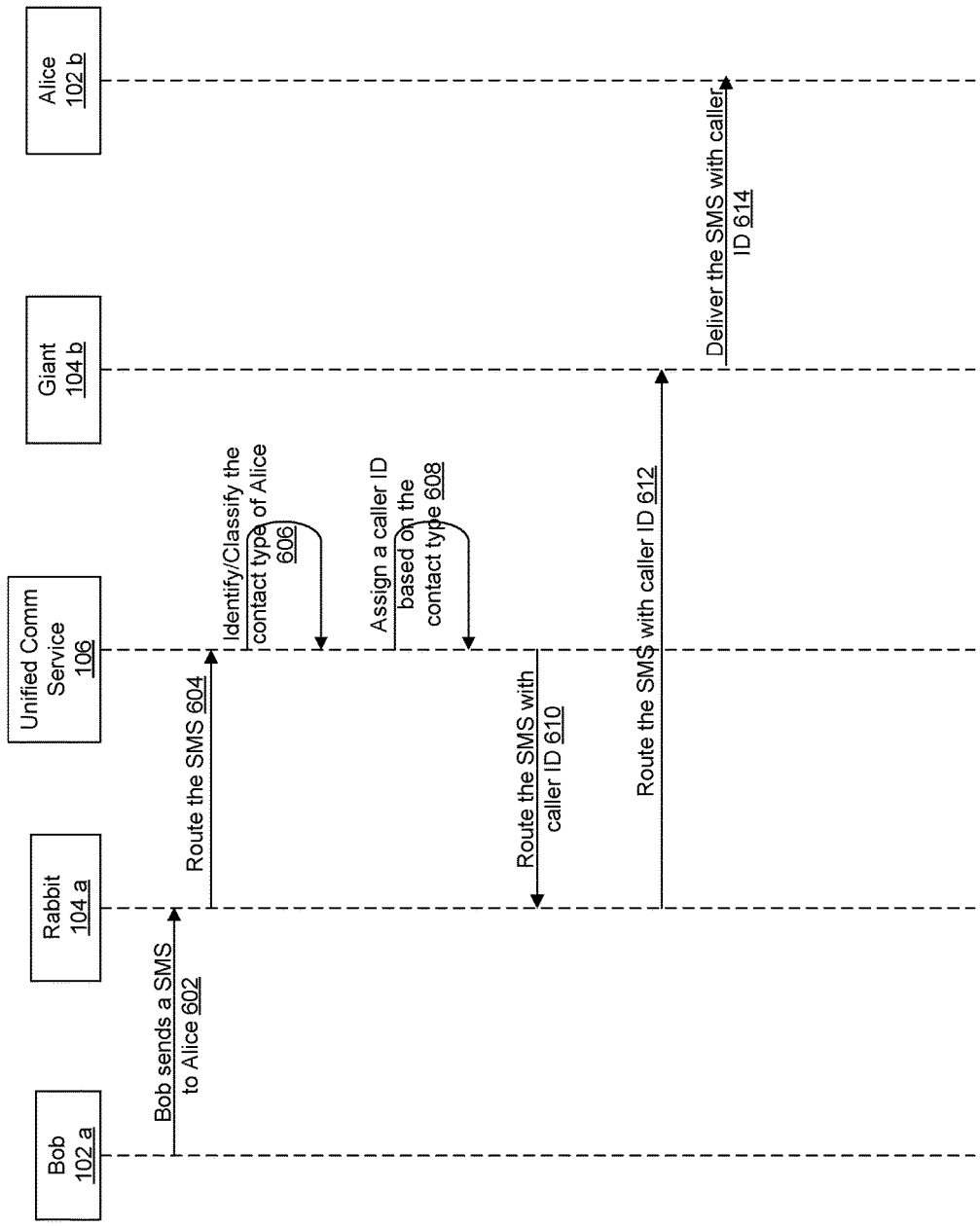
FIG. 6 illustrates a sequence diagram of an exemplary text management module, according to one embodiment.

FIG. 6 illustrates a sequence diagram of an exemplary text management module 214, according to one embodiment. A user Bob 102a sends 602 a SMS to a recipient Alice 102b from his cellphone which is linked to two numbers including a work phone number and a personal phone number. Bob 102a sends the SMS from an interface provided by the unified communication service 106 or the native messaging interface of his cellphone. Bob's cellphone service provider Rabbit 104a routes 604 Bob's SMS to Alice to the unified communication service 106. Rabbit 104a routes 604 the SMS to the unified communication service 106 according to various communication protocols, for example, Short Message Peer-to-Peer ("SMPP"). The SMS may be routed to a Short Message Service Center ("SMSC") provided by the unified communication service 106. The unified communication service 106, for example, the text management module, identifies or classifies 606 the contact type of Alice, for example, as business or personal. The unified communication service 106 assigns 608 a caller ID based on the determined contact type. For example, Bob's work phone number should be used when Alice is determined to be a business contact and Bob's personal phone number should be used when Alice is determined to be a personal contact. The unified communication service 106 routes 610 the SMS with the caller ID to Rabbit 104a. Rabbit 104a routes 612 the SMS with the caller ID to Alice's service provider Giant 104b. Giant 104b delivers the SMS with the caller ID to Alice 102b. It should be noted that in some embodiments, the unified communication service 106 routes the SMS with the caller ID directly to Giant 104b (without first routing through Rabbit 104a). Similarly, the unified communication service 106 can route the SMS with the caller ID to a different service provider, or to a $3^{rd}$ party messaging service that in turn forwards the message to Alice 102b.

Figure 7:
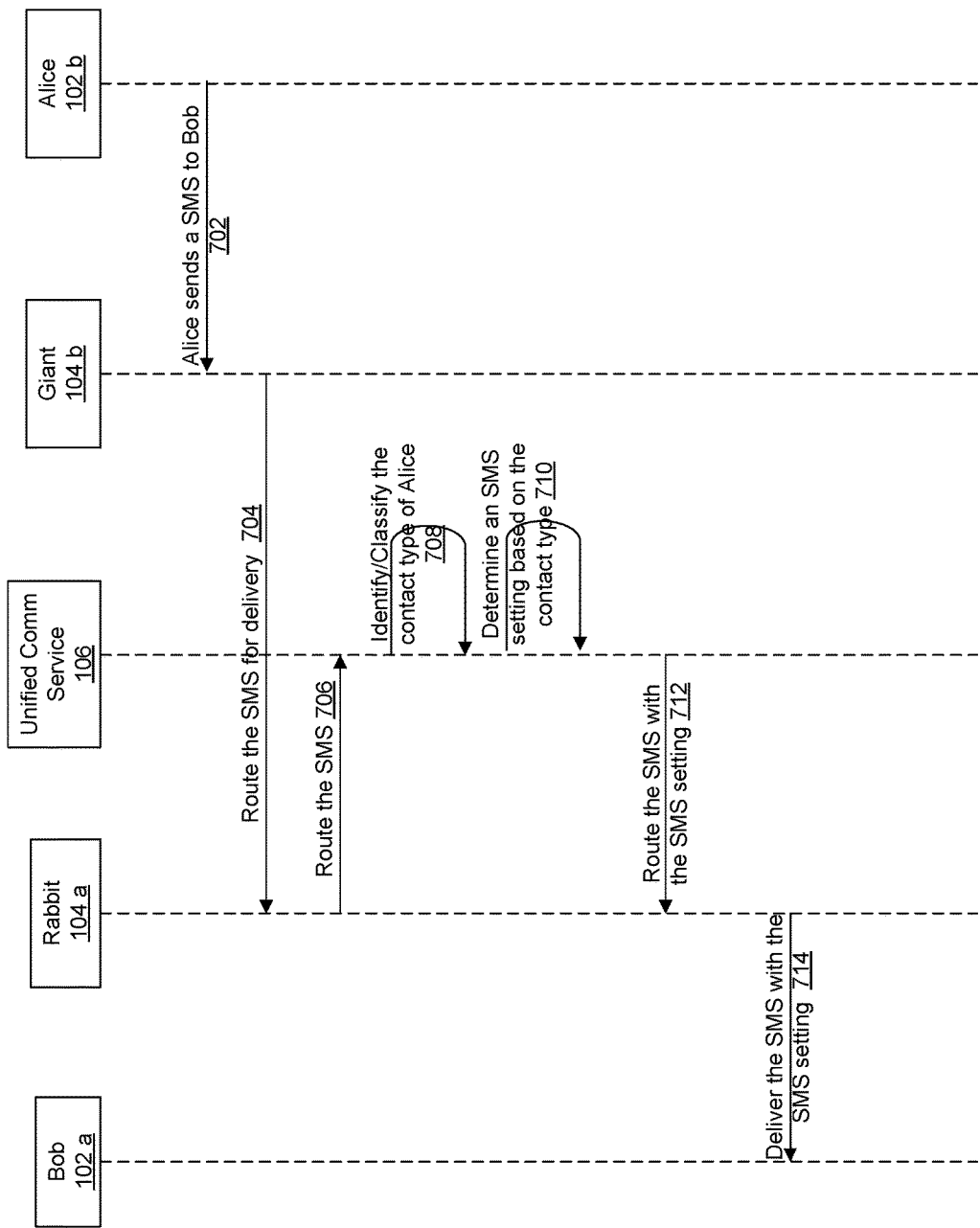
FIG. 7 illustrates a sequence diagram of an exemplary text management module, according to one embodiment.

FIG. 7 illustrates a sequence diagram of an exemplary text management module 214, according to one embodiment. A sender Alice 102b sends 702 an SMS to Bob at Bob's phone number, and Alice's service provider Giant 104b routes 704 the SMS to Bob's service provider Rabbit 104a. Rabbit 104a routes 706 the SMS to the unified communication interface 106, according to various communication protocols, for example, Short Message Peer-to-Peer ("SMPP"). The SMS may be routed to a Short Message Service Center ("SMSC") provided by the unified communication service 106. The unified communication service 106, for example, the text management module 214 identifies or classifies 708 the contact type of Alice, for example based on whether Alice sent a message to Bob's work phone number or home phone number. The unified communication service 106 determines 710 an SMS setting based on the determined contact type. Whether or not the SMS should be routed to Bob, whether Bob should be notified at Bob's phone, how to notify Bob on Bob's phone, whether there are other device(s) additional to Bob's phone and how to notify Bob on those devices are determined based on the type of contact of Alice. The unified communication service 106 routes 712 the SMS with the SMS setting to Rabbit 104a, which routes 714 the SMS with the SMS setting to Bob 102 a at his phone. When Bob's phone is offline, Rabbit 104a may try to deliver the SMS to Bob for a predetermined time period, after which Rabbit 104a may notify the unified communication service 106 that delivering the SMS to Bob has failed.

Figure 8:
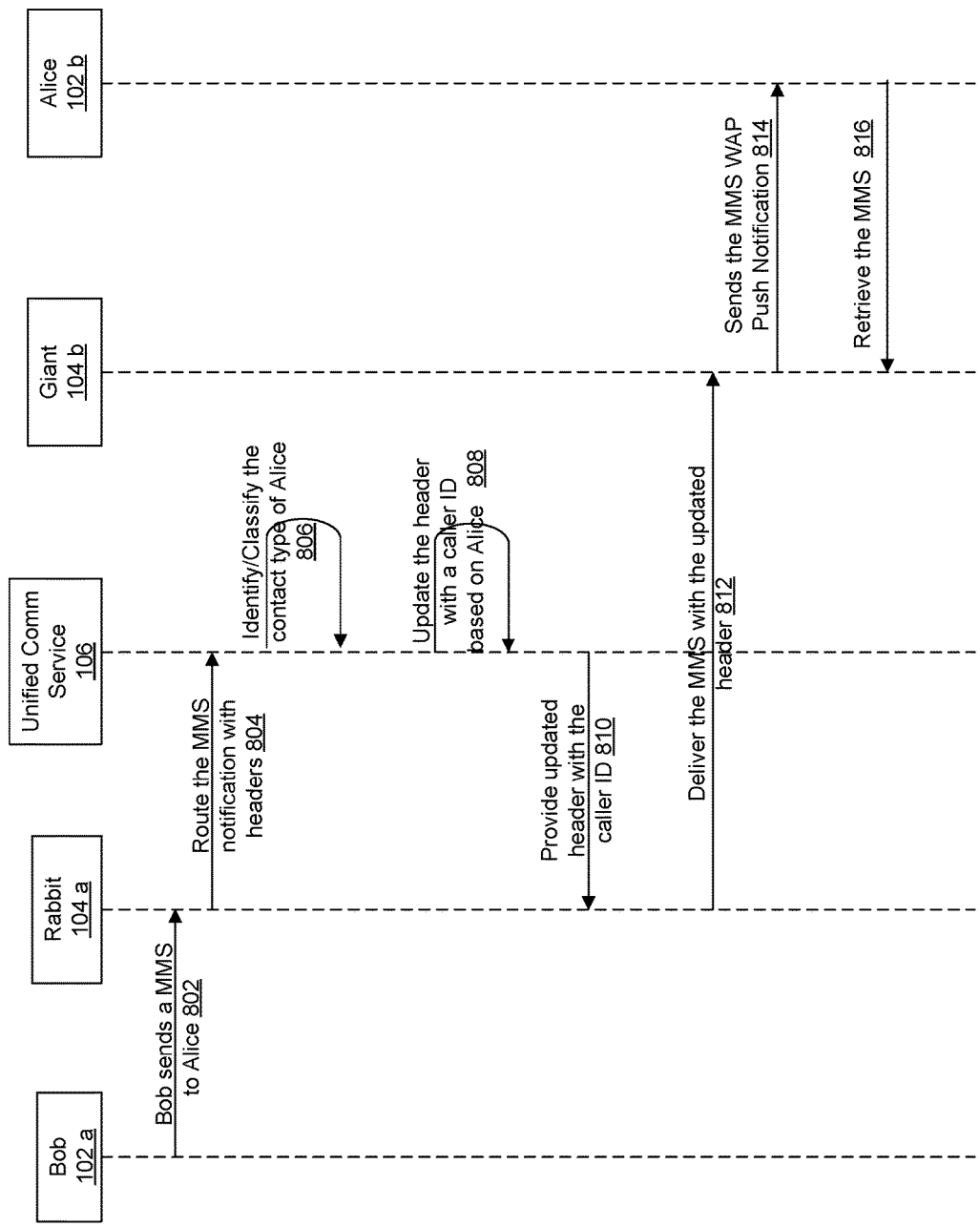
FIG. 8 illustrates a sequence diagram of an exemplary text management module, according to one embodiment.

FIG. 8 illustrates a sequence diagram of an exemplary text management module 214, according to one embodiment. A user Bob 102 sends 802 a MMS to a recipient Alice 102*b* from his cellphone which is linked to two numbers including a work phone number and a personal phone number. Bob 102*a* sends the MMS from an interface provided by the unified communication service 106 or the native dialer of his cellphone. Bob's cellphone service provider Rabbit 104*a* routes 804 Bob's MMS to Alice notification with headers to the unified communication service 106. The unified communication service 106, for example, the text management module, identifies or classifies 806 the contact type of Alice, for example, as business or personal. The unified communication service 106 assigns 808 a caller ID based on the determined contact type and updates the MMS notification header with the caller ID. For example, Bob's work phone number should be used when Alice is determined to be a business contact and Bob's personal phone number should be used when Alice is determined to be a personal contact. The unified communication service 106 provides 810 the MMS notification with the updated header to Rabbit 104*a*. Rabbit 104*a* delivers 812 the MMS with the updated header to Alice's service provider Giant 104*b*, for example, according to an MMS architecture standard. Giant 104*b* sends 814 the MMS Wireless Application Protocol (WAP) push notification to Alice 102*b*. Alice 102*b* retrieves 814 the MMS from Giant 104*b*, for example, a MMS center.

Figure 9:
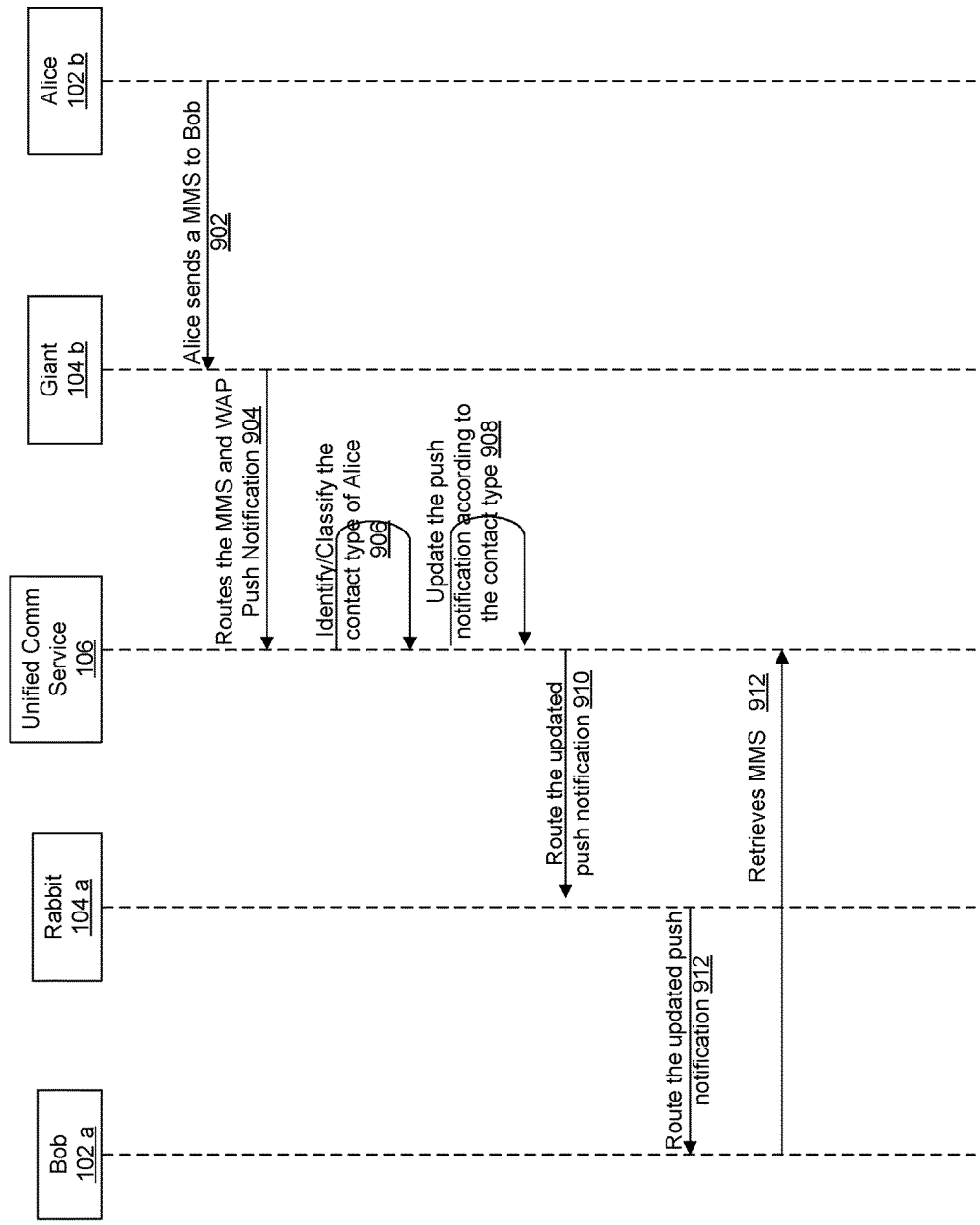
FIG. 9 illustrates a sequence diagram of an exemplary text management module, according to one embodiment.

FIG. 9 illustrates a sequence diagram of an exemplary text management module, according to one embodiment. A sender Alice 102*b* sends 902 an MMS to Bob at Bob's phone number, and Alice's service provider Giant 104*b* routes 904 the MMS to unified communication service 106, for example, over MM4 by using Service Provider ID (SPID) of unified communication service 106. Alice's MMS push notification may also be routed to unified communication service 106, for example, to the SMSC provided by the unified communication service 106 via SMPP. The unified communication service 106, for example, the text management module 214 identifies or classifies 906 the contact type of Alice, for example, as business or personal. The unified communication service 106 updates 908 the push notification according to the identified contact type. The unified communication service 106 routes 910 the updated MMS push notification to Rabbit 104*a*, which routes 912 the updated MMS push notification to Bob 102*a* at his phone. When Bob's phone is offline, Rabbit 104*a* may try to deliver the updated MMS push notification to Bob for a predetermined time period, after which Rabbit 104 may notify the unified communication service 106 that delivering the MMS push notification to Bob has failed. Bob 102*a* retrieves 912 the MMS from the unified communication service 106.

Referring back to FIG. 2, the billing management module 216 manages billing for various communication services provided to billing accounts. A billing account stored in the billing account store 220 may be associated with one or more user accounts stored in the user and contact store 204. For example, a corporate billing account may be associated with a corporate entity's account, which in turn is associated with multiple employee user accounts. The billing management module 216 tracks and monitors the usage of various communication services to devices associated with various user accounts and determines billing based on the monitored usage and a corresponding policy plan. For example, the billing management module 216 can track and monitor call usage, text usage, or data plan usage for the unified communication IDs, the device IDs, and the virtual device IDs. For example, for a user's phone linked to a work number associated with a virtual device ID or the unified communication ID and a personal number associated with the device ID, the billing management module 216 may track and monitor various (e.g., personal, business, domestic, international, roaming, etc.) usages for the work phone number and for the personal number and provide separate billings based on the monitored usage.

Figure 10:
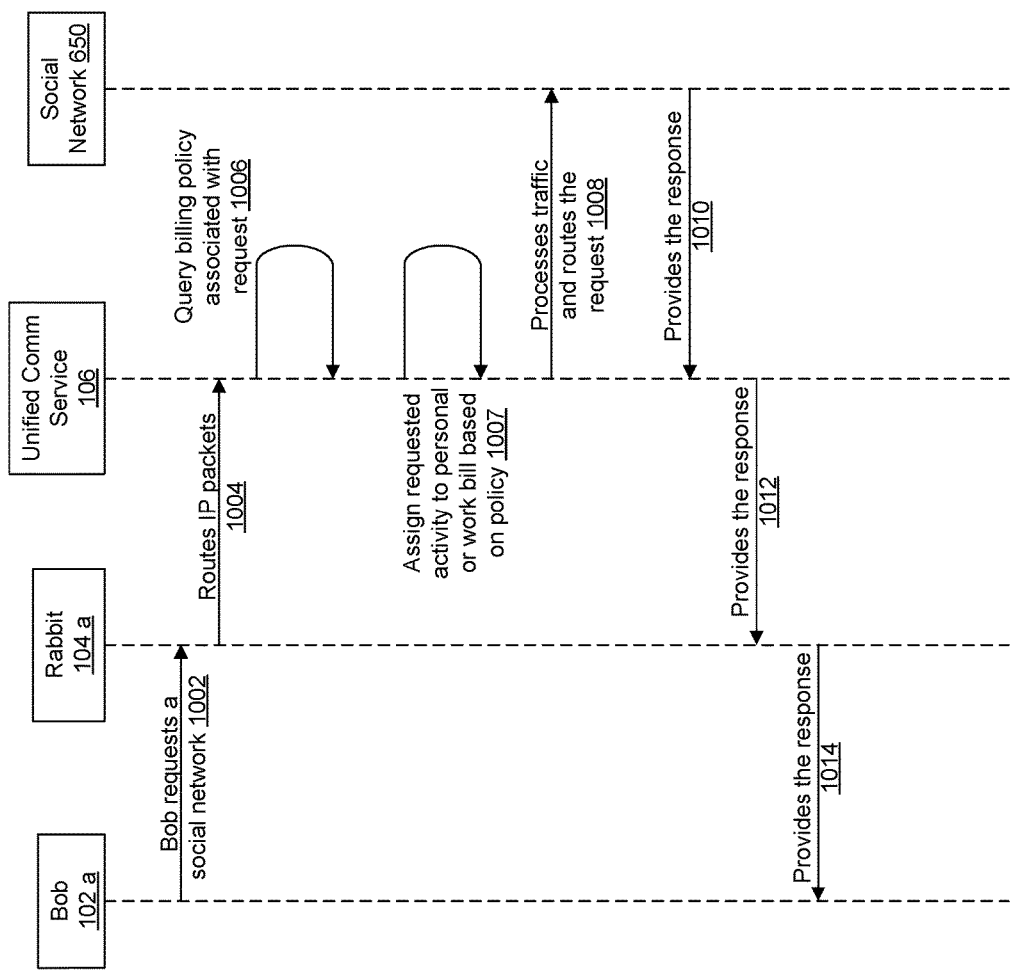
FIG. 10 illustrates a sequence diagram of an exemplary billing management module, according to one embodiment.

FIG. 10 illustrates a sequence diagram of an exemplary billing management module 216, according to one embodiment. Bob 102*a* requests 1002 access to a social network on his phone, which is sent to his service provider Rabbit 104*a*. Rabbit 104*a* routes 1004 the IP packets to the unified communication service 106, which queries 1006 a billing policy that classifies social network activity as personal activity, and assigns 1007 this activity to personal billing. The unified communication service 106 processes 1008 traffic and routes the request to the social network 650. The social network 650 provides 1010 access and social network data to the unified communication service 106, which provides 1012 the social network data to Rabbit 104*a*, which in turn provides 1014 the social network data to Bob 102*a*.

The billing management module 216 enables a network administrator, employer account administrator, or the like to create one or more billing policies to govern a user's device usage and to route expenses related to such usage to the appropriate account (such as a work account paid for by an employer, or a personal account paid for by the user). In some embodiments, a billing policy can identify a contact group (such as "work contacts") or a set of numbers associated with a work account such that calls to work-related numbers are paid for by the employer, while calls to other numbers are paid for by the user. Billing policies can also identify an amount of data a user can send and receive via a work account, such that an employer will pay for data up to the identified amount, and the user will pay for the remainder of data used (for instance, within a billing period). Billing policies can likewise identify a number of calling minutes and/or text messages that are covered by a work account (and thus paid for by an employer), such that call time or text messages over the identified thresholds are billed to a personal account (and thus paid for by the user).

Billing policies can also specify particular URLs or websites, and can route costs incurred with navigating to the specified URLs and websites to a particular account (such as a work account). Likewise, billing policies can blacklist particular URLs or websites, such that costs incurred with navigating to the blacklisted URLs and websites are prevented from being routed to a particular account (such as a work account) and are instead routed to a different account (such as a personal account). Billing policies can also specify other services/charges, and can specify a particular account which to route charges associated with the specified services/charges. Examples of such services/charges include roaming charges, map or navigation services, email services, text or SMS charges, app services or charges, and the like.

Referring back to FIG. 2, the privacy management module 218 manages privacy settings for various communication services. The privacy management module 218 may provide a user interface, via which a user may make various communications private to other users. For example, a user may make phone calls, text messages, web activities private such that the communications are secured, not recorded, and only accessible by the user. For example, a user's phone is linked to a work number associated with a virtual device ID or unified communication ID and a personal number associated with the device ID, and the user may classify all communications associated with the personal number as private and not subject to access by the user's employer. In such embodiments, even if a user's employer provides a billing policy that enables and pays for the user to access, for example, a social network, the user may instead select to keep such activity private, hiding access to the social network from the user, but requiring that the user pay for data charges associated with the access to the social network.

The home number management module 222 can enable multiple phones, such as phones belonging to members of a family, to share a phone number. The home phone number is in addition to a user's personal and work phone numbers. A user can register a home phone number with the unified communication service 106 via the user management module 202, which in turn can assign a second virtual device ID to a user's device, and can associate the home phone number with the second virtual device ID. The user can then, via the home number management module 222, associate the home phone number with devices of family members, which in turn are assigned virtual device IDs, which are then associated with the home phone number. In other words, the home number management module 222 enables multiple users to receive calls made to the same number, emulating the traditional family/household land line phone number.

The home number management module 222, in response to receiving a call to a home phone number of a group of users, can ring all phones sharing the home phone number. In some embodiments, when one user in the group of users answers the call, the phones of the other users in the group of users stop ringing. In some embodiments, when a user in the group of users answers the call, the user is prompted to either answer the call or divert the call to voicemail. In response to the user selecting to divert the call to voicemail, the phones of the other members of the group of users continue to ring until one user opts to answer the call. If all users in the group of users opt to divert the call to voicemail, or if no user opts to answer the call within a pre-designated amount of time, the call is routed to voicemail.

The home number management module 222, in response to the creation of a voicemail by a contact calling a home phone number, can store the voicemail in the voicemail inboxes of one or more users sharing the home phone number. For instance, the voicemail can be left in the voicemail inbox of the head of household or of the user that initially registered the home phone number; alternatively, every user sharing the home phone number can receive the voicemail in their inbox. In some embodiments, the home number management module 222 routes the voicemail to a shared voicemail inbox accessible to all users that share the home phone number. In such embodiments, if one user deletes the voicemail, the other users sharing the shared inbox can no longer access the voicemail.

In some embodiments, the home number management module 222 identifies calls to the home phone as home calls, enabling devices of users sharing the home phone number to ring using a ringtone, vibration pattern, or other notification dedicated to calls to the home phone number. The home number management module 222 can direct calls to the home phone number directly to the devices of the users associated with the home phone number, preventing (for example) a user's employer from intercepting or otherwise being notified about the calls.

The business integration module 224 may allow integration with business software or interfaces such as customer relationship management (CRM) systems. Business communication, as a result, can be accessed and tracked by the integrated systems. A user (e.g., a person or entity) may configure an account with a selected CRM system and application program interface (API) credentials to access the selected CRM system. The business integration module 224 may automatically integrate business communication (e.g., communication with a business CRM contact, lead, or account) into the selected CRM system. The business integration module 224 may 1) record that a call is made or received, and whether it is answered; 2) record calls made and store the recorded audio; 3) record calls made, transcribe the audio into text, store the text, and make the call text searchable and analyzable; 4) store text messages received and sent as individual events or as conversations within a given timespan; or 5) store voicemails received and optionally transcribe them.

The business integration module 224 may further provide a business software or system interface that allows a user to interact with business contacts using their mobile phone and/or mobile phone number, from the business software or system interface. The business integration module 224 may establish a communication connection with a user prior to contacting the user's business contact. For example, the business integration module 224 may call the user's cellphone number to establish a connection or to use a virtual version of their mobile phone as a web application (for instance, via webRTC) to communicate to the unified communication service 106. The business integration module 224 may then contact the user's business contact to establish a communication channel between the user and the user's business contact via the unified communications service 106. A user may continue a voice or text conversation from the interface, which may open up a window surfacing recent or all communications up to date with that business contact. In some embodiments, all communication with the business contact from all employees associated with an entity may be aggregated and presented to a user. The full extent of communications including conversations or messaging threads across the entity with a business contact may be presented to users that are associated with the entity and authorized to view such communications. As such, different users may communicate with a business contact via a shared number (e.g., a sales number or a customer support number).

Upon reading this disclosure, those of skill in the art will appreciate still additional alternative designs for a unified communication interface providing various communication services. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A computer-implemented method for managing outgoing calls, comprising:
  receiving, at an intermediate server communicatively coupled to a mobile phone associated with a first phone number corresponding to a first contact group and a second phone number corresponding to a second contact group, a request from the mobile phone to make an outgoing call, the request including a recipient phone number;
  in response to determining the recipient phone number is not included in the first contact group or the second contact group:

determining, by the intermediate server, a selected default contact group between the first contact group and the second contact group, and selecting, by the intermediate server, caller identification ("caller ID") information based on the selected default contact group;

modifying, by the intermediate server, the request to make an outgoing call to include the selected caller ID information; and routing, by the intermediate server, the modified request to a mobile service provider.

2. The method of claim 1, wherein the first phone number comprises a phone number corresponding to hardware of the mobile phone.

3. The method of claim 2, wherein the second phone number comprises a virtual phone number assigned to the mobile phone by the intermediate server.

4. The method of claim 1, further comprising:
in response to determining the recipient phone number is included in the first contact group:
selecting, by the intermediate server, caller ID information corresponding to the first contact group.

5. The method of claim 4, further comprising:
in response to determining the recipient phone number is included in the second contact group:
selecting, by the intermediate server, caller ID information corresponding to the second contact group.

6. The method of claim 1, further comprising including the recipient phone number in the selected default contact group.

7. The method of claim 1, wherein the request to make the outgoing call is placed by a user of the mobile phone from a native call interface of the mobile phone.

8. A non-transitory computer-readable storage medium storing executable computer instructions for managing outgoing calls that, when executed by a hardware processor, perform steps comprising:
receiving, at an intermediate server communicatively coupled to a mobile phone associated with a first phone number corresponding to a first contact group and a second phone number corresponding to a second contact group, a request from the mobile phone to make an outgoing call, the request including a recipient phone number;
in response to determining the recipient phone number is not included in the first contact group or the second contact group:
determining, by the intermediate server, a selected default contact group between the first contact group and the second contact group, and
selecting, by the intermediate server, caller identification ("caller ID") information based on the selected default contact group;
modifying, by the intermediate server, the request to make an outgoing call to include the selected caller ID information; and
routing, by the intermediate server, the modified request to a mobile service provider.

9. The non-transitory computer-readable storage medium of claim 8, wherein the first phone number comprises a phone number corresponding to hardware of the mobile phone.

10. The non-transitory computer-readable storage medium of claim 9, wherein the second phone number comprises a virtual phone number assigned to the mobile phone by the intermediate server.

11. The non-transitory computer-readable storage medium of claim 8, wherein the executable computer instructions, when executed by the hardware processor, perform further steps comprising:
in response to determining the recipient phone number is included in the first contact group:
selecting, by the intermediate server, caller ID information corresponding to the first contact group.

12. The non-transitory computer-readable storage medium of claim 11, wherein the executable computer instructions, when executed by the hardware processor, perform further steps comprising:
in response to determining the recipient phone number is included in the second contact group:
selecting, by the intermediate server, caller ID information corresponding to the second contact group.

13. The non-transitory computer-readable storage medium of claim 8 wherein the executable computer instructions, when executed by the hardware processor, perform further steps comprising including the recipient phone number in the selected default contact group.

14. The non-transitory computer-readable storage medium of claim 8, wherein request to make the outgoing call is placed by a user of the mobile phone from a native call interface of the mobile phone.

15. A system for managing outgoing calls, comprising:
an intermediate server communicatively coupled to a mobile phone associated with a first phone number corresponding to a first contact group and a second phone number corresponding to a second contact group, the intermediate server comprising a non-transitory computer-readable storage medium storing executable instructions and one or more hardware processors configured to execute the instructions to perform steps comprising:
receiving a request from the mobile phone to make an outgoing call, the request including a recipient phone number;
in response to determining the recipient phone number is not included in the first contact group or the second contact group:
determining, by the intermediate server, a selected default contact group between the first contact group and the second contact group, and
selecting, by the intermediate server, caller identification ("caller ID") information based on the selected default contact group;
modifying, by the intermediate server, the request to make an outgoing call to include the selected caller ID information; and
routing, by the intermediate server, the modified request to a mobile service provider.

16. The system of claim 15, wherein the first phone number comprises a phone number corresponding to hardware of the mobile phone.

17. The system of claim 16, wherein the second phone number comprises a virtual phone number assigned to the mobile phone by the intermediate server.

18. The system of claim 15, wherein the one or more hardware processors are configured to execute the instructions to perform further steps comprising:
in response to determining the recipient phone number is included in the first contact group:
selecting, by the intermediate server, caller ID information corresponding to the first contact group.

19. The system of claim 18, wherein the one or more hardware processors are configured to execute the instructions to perform further steps comprising:
  in response to determining the recipient phone number is included in the second contact group:
    selecting, by the intermediate server, caller ID information corresponding to the second contact group.

20. The system of claim 15, wherein the request to make the outgoing call is placed by a user of the mobile phone from a native call interface of the mobile phone.

* * * * *